US010528486B2

(12) United States Patent
Chhabra et al.

(10) Patent No.: US 10,528,486 B2
(45) Date of Patent: Jan. 7, 2020

(54) TECHNIQUES FOR CRYPTO-AWARE CACHE PARTITIONING

(71) Applicant: INTEL CORPORATION, Santa Clara, CA (US)

(72) Inventors: Siddhartha Chhabra, Portland, OR (US); Saeedeh Komijani, Mountain View, CA (US)

(73) Assignee: INTEL CORPORATION, Santa Clara, CA (US)

( * ) Notice: Subject to any disclaimer, the term of this patent is extended or adjusted under 35 U.S.C. 154(b) by 203 days.

(21) Appl. No.: 15/639,119

(22) Filed: Jun. 30, 2017

(65) Prior Publication Data
US 2019/0004974 A1    Jan. 3, 2019

(51) Int. Cl.
| | | |
|---|---|---|
| *G06F 21/00* | (2013.01) | |
| *G06F 12/14* | (2006.01) | |
| *G06F 12/0875* | (2016.01) | |
| *G06F 21/79* | (2013.01) | |
| *G06F 21/85* | (2013.01) | |

(52) U.S. Cl.
CPC ...... *G06F 12/1408* (2013.01); *G06F 12/0875* (2013.01); *G06F 21/79* (2013.01); *G06F 21/85* (2013.01); *G06F 2212/401* (2013.01); *H04L 2209/125* (2013.01)

(58) Field of Classification Search
CPC ...... G06F 21/6227; G06F 16/93; G06F 21/31; G06F 16/9535; G06F 16/2228; G06F 16/248; G06F 21/6218
See application file for complete search history.

(56) References Cited

U.S. PATENT DOCUMENTS

2016/0321287 A1* 11/2016 Luthra ............... G06F 16/182
2017/0295021 A1* 10/2017 Aranda Gutierrez ........................ H04L 9/0637
2018/0285403 A1* 10/2018 Legler ............... G06F 16/2329

* cited by examiner

*Primary Examiner* — Ghazal B Shehni

(57) ABSTRACT

Various embodiments are generally directed to techniques for crypto-aware cache partitioning, such as with a metadata cache for an integrity tree, for instance. Some embodiments are particularly directed to a cache manager that implements partitioning of a cryptographic metadata cache based on locality characteristics of the cryptographic metadata. For instance, locality characteristics of different levels of an integrity tree may be utilized to partition a metadata cache for the integrity tree.

24 Claims, 9 Drawing Sheets

Storage Medium 700

*Computer Executable Instructions for 500*

*Computer Executable Instructions for 600*

*900*

TECHNIQUES FOR CRYPTO-AWARE CACHE PARTITIONING

BACKGROUND

Cryptography may refer to the practice and study of techniques for secure communication in the presence of third parties. More generally, cryptography is about constructing and analyzing protocols that prevent third parties from reading private data. In application, cryptography can involve one or more of encryption and decryption. Encryption can be the process of converting ordinary information, referred to as plaintext, into an unintelligible sequence of symbols, referred to as ciphertext, and decryption can be the process of converting ciphertext back to plaintext. Typically, a cipher system may include a pair of algorithms that convert data back and forth between plaintext and ciphertext.

BRIEF DESCRIPTION OF THE DRAWINGS

FIG. 7 illustrates an embodiment of a storage medium.

DETAILED DESCRIPTION

Figure 1:
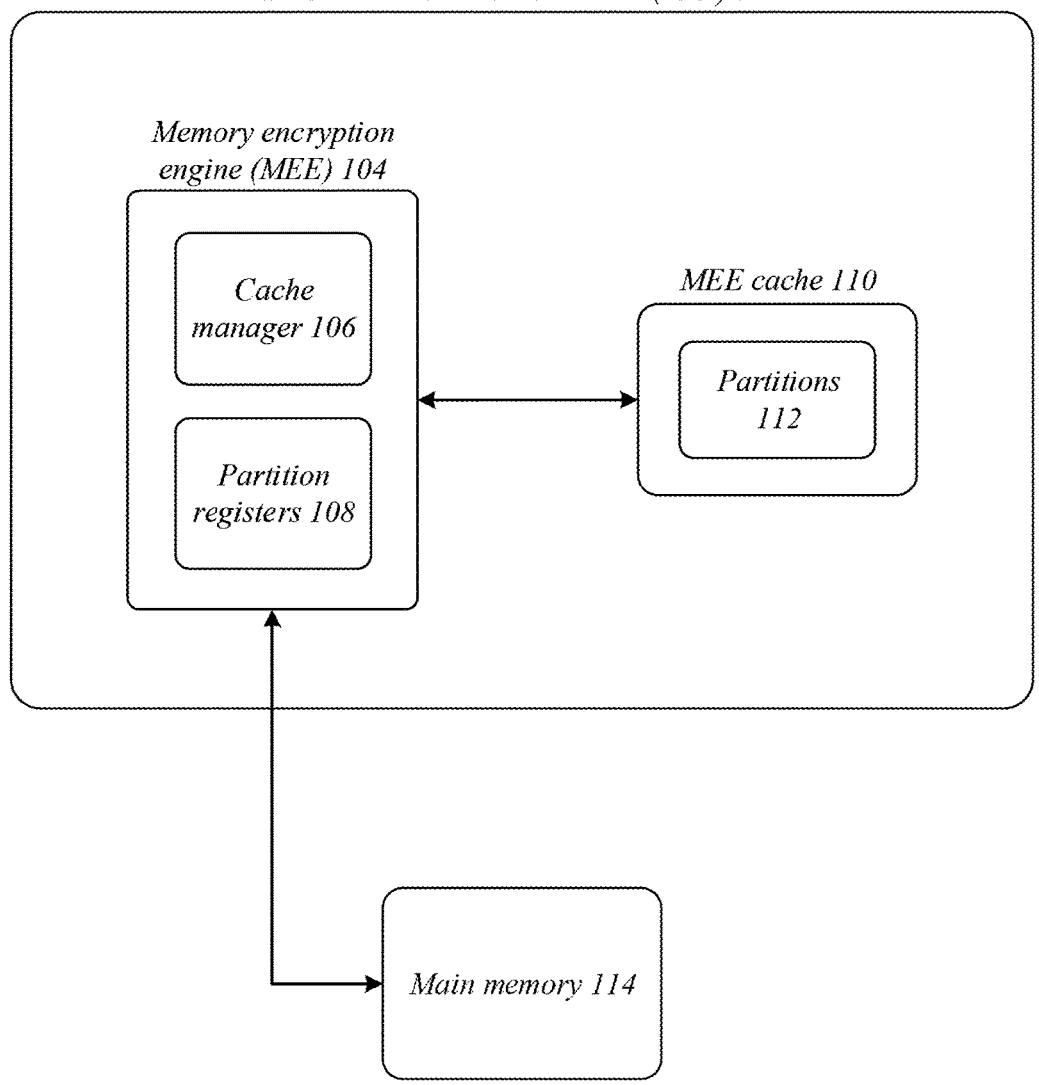
FIG. 1 illustrates an embodiment of a first operating environment.

Various embodiments are generally directed to techniques for crypto-aware cache partitioning, such as with a metadata cache for an integrity tree, for instance. Some embodiments are particularly directed to a cache manager that implements partitioning of a cryptographic metadata cache based on locality characteristics of the cryptographic metadata. For instance, locality characteristics of different levels of an integrity tree may be utilized to partition a metadata cache for the integrity tree. In one or more embodiments, for example, an apparatus may comprise a memory and logic for a memory encryption engine (MEE), at least a portion of the logic implemented in circuitry coupled to the memory. In one or more such embodiments, the logic may fetch metadata associated with a level of an integrity tree from main memory and determine whether one or more partitions in a set of partitions of a cache are allocated to the level of the integrity tree associated with the metadata. In various embodiments, the logic may store the metadata in a partition of the one or more partitions of the cache when one or more partitions of the cache are allocated to the level of the integrity tree associated with the metadata, or leave the metadata absent from the cache when one or more partitions of the cache are not allocated to the level of the integrity tree associated with the metadata. These and other embodiments are described and claimed.

Some challenges facing MEEs include the inability or use of excessively complex, bulky, and inefficient techniques to provide data stored in main memory with memory protections, such as memory confidentiality, integrity, and replay protection. These challenges may result from large overheads associated with implementing an integrity tree. For instance, when a protected data line is loaded from main memory, it may need to be verified along a branch of an integrity tree moving up to the root in a tree walk. In such instances, this may result in increased cryptographic operations and hence increased delay before a data line that is loaded can be verified as fresh and unmodified. Adding further complexity, a miss stream coming to an MEE may have little to no spatial locality, such as with respect to memory references for computing platform workloads. This may limit the effectiveness of caching portions of the integrity tree utilized in previous tree walks, and result in unacceptable overheads. For example, a miss stream coming to an MEE from a last-level cache (LLC) in a server may have little to no spatially locality for multiple reasons. First, the LLC in servers may be several megabytes (MBs) in size, which absorbs more misses and makes the miss stream more randomized. Second, a large number of threads may run simultaneously on a server, along with larger working sets of serving applications, causing thrashing in the LLC and again making the miss stream more randomized. These and other factors may result in MEEs with poor performance and limited adaptability. For instance, it may be impractical to implement an MEE across both server and client platforms. Such limitations can drastically reduce the capabilities, usability, and applicability of the MEE, contributing to inefficient systems with limited flexibility.

Various embodiments described herein include an MEE with a cache manager that implements cache partitioning to cryptographic metadata based on locality characteristics of tree levels. In various such embodiments, the cache manager may use locality characteristics of different levels in an integrity tree to partition a metadata cache to improve the its hit rate and shorten tree walks, thereby improving power, bandwidth, and/or performance characteristics for integrity and replay protection. For instance, the cache manager may allocate cache partitions, such as cache ways or cache lines, to the tree levels that achieve a higher number of hits. In some embodiments, this may prevent other tree levels that do not have locality from thrashing the cache, allowing levels with better spatial locality to remain in the cache. In one or more embodiments, partitions of the cache may be dynamically allocated/reallocated to improve cache performance. For example, partitions of a cache may be reallocated from a first level to a second level of an integrity tree based on hit rates in the cache associated with the first level and the second level. In these and other ways the MEE may enable quick and efficient memory protections to achieve improved memory security with better flexibility, increased capabilities, and higher efficiencies, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an example of an operating environment 100 that may be representative of various embodiments. Operating environment 100 may include trusted execution environment (TEE) 102 and main memory 114. In operating environment 100, TEE 102 may include MEE 104 with cache manager 106 and partition registers 108 and MEE cache 110 with partitions 112. In one or more embodiments described herein, cache manager 106 may divide MEE cache 110 into partitions 112 via partition registers 108 based on locality characteristics of metadata stored in main memory 114. In some embodiments, this may improve hit rates for MEE cache 110, thereby improving bandwidth and performance characteristics for integrity and replay-protection. Embodiments are not limited in this context.

In various embodiments, TEE 102 may provide a secure environment that can provide a protected platform for encryption operations. In various such embodiments, TEE 102 may include a secure portion of a processor element. For example, code and data loaded within TEE 102 may be protected with respect to confidentiality and integrity. In some embodiments, encrypting and decrypting data may only occur within TEE 102, thereby preventing access to unsecure data. In one or more embodiments, MEE 104 may be located within TEE 102. In various embodiments, MEE 104 may provide confidentiality, integrity, and replay-protection to protected data stored in main memory 114.

In some embodiments, MEE 104 may build a metadata tree (i.e., integrity tree) over a set of protected data lines in main memory 114 to provide integrity and replay protection. In various such embodiments, MEE 104 may be provisioned with one or more cryptographic keys or key pairs to implement the memory protections. In some embodiments, MEE 104 may provide protection against active and/or passive attacks. Active attacks may include attacks where an attacker has physical access to the system and can modify data values stored outside of TEE 102 (e.g., main memory 114), however, the attacker may not modify data stored inside of TEE 102 (e.g., partition registers 108 and MEE cache 110). Passive attacks may include attacks where an attack observes data as it moves into and out of TEE 102, such as to and from main memory 114.

In one or more embodiments, MEE 104 may provide encryption to protected data in main memory 114 to protect against passive attacks. In various such embodiments, MEE 104 may use counter mode encryption. In some embodiments, cryptographic work required to encrypt/decrypt a data line may be decoupled from the data itself. For example, a seed, or cryptographic pad, may be uniquely associated with each data line. In such examples, the data line may be encrypted/decrypted with an exclusive or (XOR) logical operation between the data line and the cryptographic pad. In some embodiments, the seed and/or cryptographic pad may include or be based on one or more portions of the metadata tree. In various embodiments, encryption may be performed with one or more cryptographic keys.

In various embodiments, counter mode encryption may require that the seed be both spatially and temporally unique. In various such embodiments, spatial uniqueness may be achieved by using the address of the data line as a component of the seed and temporal uniqueness may be achieved by associating a per-line counter that is incremented on each write back of the data line to main memory 114. In some embodiments, the per-line counter may act as a version for the data line. In one or more embodiments, MEE 104 may associated a message authentication code (MAC) with each protected data line for integrity protection. In one or more such embodiments, when a protected data line is loaded from main memory 114, its MAC may be verified to ensure that the data line was not modified while resident in main memory 114 before the protected data line is queued for decryption. In various embodiments, an attacker must replay a protected data line along with its MAC to be successful.

In some embodiments, MEE 104 may provide integrity and replay protection services to main memory 114 to protect against active attacks. For example, MEE 104 may receive a memory operation request associated with a data line of a set of data lines stored in main memory 114. The MEE 104 may identify a MAC and a version associated with the memory operation request and verify the MAC with a first cryptographic key and the version with a second cryptographic key. In some embodiments, at least a portion of MEE 104 may be implemented in circuitry coupled to a memory that is separate from the protected memory, such as a register. In some such embodiments, one or more of the cryptographic keys may be stored in the separate memory. In various embodiments, MEE 104 may use a data structure comprising a plurality of counters and embedded MACs to provide integrity and replay protection services to one or more protected data lines in main memory 114.

As will be described in more detail below, in various such embodiments, the plurality of counters (i.e., versions) and embedded MACs may be arranged in a hierarchical manner, such as in a metadata tree (i.e., integrity tree) with a plurality of levels. In some embodiments, the metadata tree may be organized the same or similar to a Merkle tree. In one or more embodiments, various levels of the metadata tree may be assigned to one or more partitions 112 of MEE cache 110. In one or more such embodiments, levels of the metadata tree may be assigned to partitions 112 of MEE cache 110 via partition registers 108. For instance, each level of the integrity tree stored in main memory 114 may be associated with a different partition register of partition registers 108. In such instances, a partition register associated with a respective level may identify which of partitions 112 have been allocated to the respective level. In some embodiments, the plurality of counters and embedded MACs may be stored in main memory 114, as one or more portions of the integrity tree, separate from the protected data lines.

Figure 2:
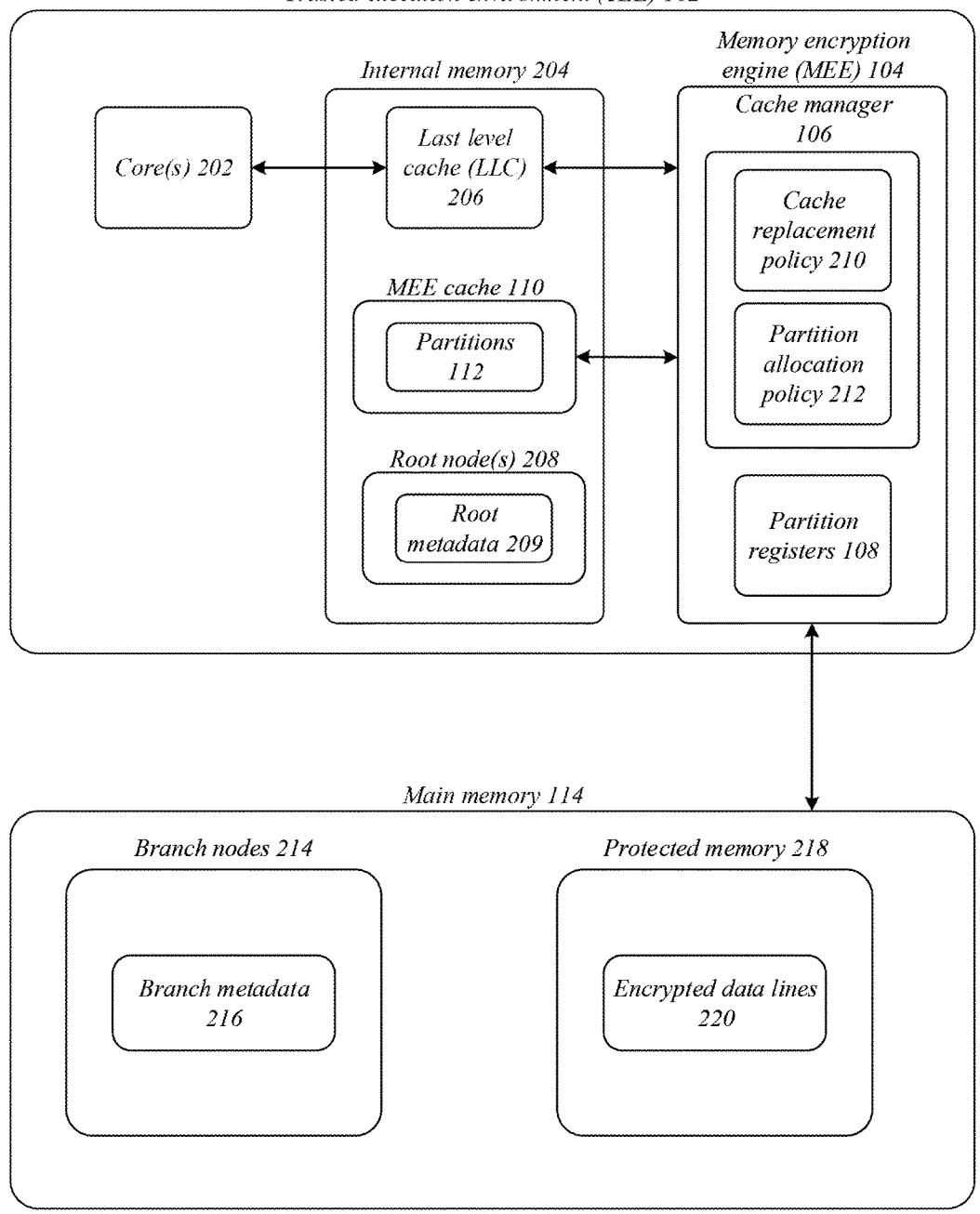
FIG. 2 illustrates an embodiment of a second operating environment.

FIG. 2 illustrates an example of an operating environment 200 that may be representative of various embodiments. In addition to the components of operating environment 100, operating environment 200 may include one or more cores 202 and internal memory 204 within TEE 102, and branch nodes 215 and protected memory 218 within main memory 114. Internal memory 204 may include last level cache (LLC) 206, MEE cache 110 with partitions 112, and root node 208 with root metadata 209. MEE 104 may include cache manager 106 with cache replacement policy 210 and partition allocation policy 212 in addition to partition registers 108. Branch nodes 214 may include branch metadata 216 and protected memory 218 may include encrypted data lines 220. In various embodiments described herein, one or more components of operating environment 200 may interoperate to enable dynamic partitioning MEE cache 110 for different portions of branch metadata 216 associated with different branch nodes of branch nodes 214 based on the locality characteristics of the different portions of branch metadata 216. For instance, branch nodes 214 may form one or more portions of an integrity tree (e.g., see integrity tree 302 of FIG. 3), and each of partitions 112 of MEE cache 110 may be allocated to a respective level of the integrity tree. In some embodiments, dynamic allocation of partitions 112 may enable an integrity tree to be implemented with reduced overhead. Embodiments are not limited in this context.

In one or more embodiments described herein, the integrity tree may be made up of one or more root nodes 208 including root metadata 209 (e.g., counter or version values) and branch nodes 214 including branch metadata 216 (e.g., counter, version, or MAC values). In some embodiments, branch nodes 214 may be stored in main memory 114 while root node(s) are 208 are stored in internal memory 204. In some such embodiments, this may reduce the amount of internal memory 204 required while still enabling replay and integrity protections to be provided to encrypted data lines 220 of protected memory 218. However, storing branch nodes 214 in main memory 114 can result in significant performance overheads because a data line loaded from protected memory 218 will need to be verified along a tree branch moving up to the root node, resulting in increased cryptographic operations and increased delay before a data line loaded can be verified to be fresh and unmodified.

In order to reduce the performance penalty due to loading of tree nodes from main memory 114, tree nodes loaded in a tree walk may be cached locally in MEE cache 110. With MEE cache 110 a tree walk may be terminated when the first node along the tree walk is found in the cache (for writes, the cached tree node should be in a modified state for the walk to be terminated). This may be the case as a node in the MEE cache 110 can be considered secure because it was verified by a previous request before being cached, and may serve the same purpose as the root node(s) 208. Accordingly, MEE cache 110 may shorten a tree walk, thereby improving integrity verification performance. In some embodiments, MEE cache 110 may be used in conjunction with Intel® Software Guard Extensions (SGX).

In various embodiments, MEE 104 may be a component between LLC 206 and main memory 114. In various such embodiments, MEE 104 may operate on the miss stream coming of LLC 206. In one or more embodiments, MEE 104 may be designed with the underlying assumption that the miss stream coming to MEE 104 will have spatial locality, such as when MEE 104 is implemented in a client platform as opposed to a server platform. In some embodiments, spatial locality may be with respect to memory references for computing platform workloads. Branch nodes 214 may cache metadata (e.g., branch metadata 216) for 8 consecutive data lines. For example, a version cache line (i.e., a cached branch node) may store the versions of 8 consecutive encrypted data lines 220 in protected memory 220. Thus, when a version line is fetched during a tree walk to verify a data line, if the next 7 data lines are accessed, they will find the version in the MEE cache 110 and the walk will be terminated there, saving any additional accesses to memory. This may work well when there is high spatial locality due to a small number of threads and/or a small sized processor cache (e.g., LLC 206), such as in a system on chip (SOC) and clients.

However, in the absence of spatial locality, such as in a server, the metadata lines (e.g., branch metadata 216) loaded to the MEE cache 110 may seldom be utilized. In some embodiments, the message authentication code (MAC) and version (VER) lines along with the lower-level lines in the tree may contribute negatively, such as by causing cache thrashing. Accordingly, various embodiments described herein may include crypto-aware metadata level based cache partitioning. In one or more embodiments, crypto-aware metadata level based cache partitioning may be used to improve bandwidth/performance characteristics associated with implementation of a metadata tree in computing platforms, such as in SOCs, clients, servers, and the like. In some embodiments, cache manager 106 may implement cache replacement policy 210 and partition allocation policy 212 to affect the crypto-aware metadata level based cache partitioning. For instance, MEE cache 110 may be dynamically divided into partitions 112 using partition registers 108 according to partition allocation policy 212. One or more portions of branch nodes 214, and thereby branch metadata 216, may be stored in a partition of MEE cache 110 based on cache replacement policy 210. Cache replacement policy 210 and partition allocation policy 212 will be described in more detail below, such as with respect to FIGS. 3-6.

Figure 3:
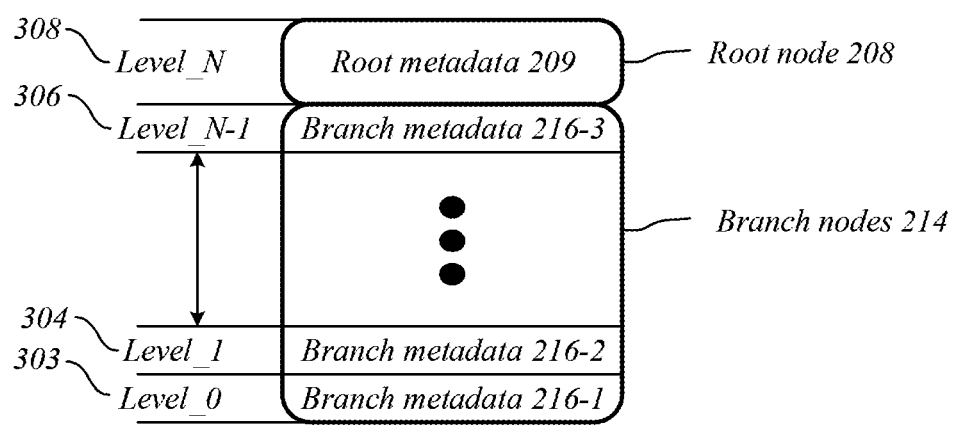
FIG. 3 illustrates an embodiment of a third operating environment.
Figure 3:
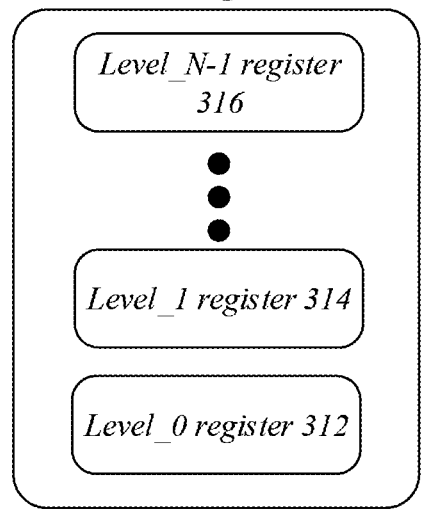

FIG. 3 illustrates an example of an operating environment 300 that may be representative of various embodiments. Operating environment 300 may include integrity tree 302 in conjunction with partition registers 108. In various embodiments described herein, partition registers 108 may be utilized to assign or indicate different levels of integrity tree 302 to partitions of MEE cache 110. In various such embodiments, this may be referred to as crypto-tree level cache partitioning. In one or more embodiments, cache manager 106 may determine whether to store branch nodes 214 loaded from main memory 114 in MEE cache 110 based on a tree level associated with a respective branch node, partition registers 108, and/or partition allocation policy 212. In some embodiments, a partition register may be included for each level of branch nodes 214. In other words, a partition register may be included for each level of integrity tree 302 except the root level (i.e., level_N 308). For instance, partitions of MEE cache 110 allocated to level_0 303 of integrity tree 302 may be indicated by level_0 register 312, partitions of MEE cache 110 allocated to level_1 304 of integrity tree 302 may be indicated by level_1 register 314, and partitions of MEE cache 110 allocated to level_N−1 306 of integrity tree 302 may be indicated by level_N−1 register 316. Embodiments are not limited in this context.

In various embodiments, crypto tree-level cache partitioning may allow dynamic allocation of partitions (e.g., cache ways or cache lines) in MEE cache 110 to exploit the locality characteristics at different levels of integrity tree 302. In various such embodiments, this may serve to allocate partitions, such as ways or lines, to those levels that achieve a higher hit rate. This may serve multiple purposes. First, MEE accesses will stop on finding a level in the cache. Second, the other levels, which do not have good locality, will not thrash MEE cache 110, causing levels with good spatial locality to get evicted out of MEE cache 110. In some embodiments, way-partitioning may be used. For instance, specific numbers of ways may be assigned to different levels of integrity tree 302, thereby limiting a particular tree level to occupying space in an associated partition (e.g., formed by the ways allocated for that level).

In some embodiments, typical or standard workloads to run on a platform may be used to determine the platform allocation. For instance, in some embodiments, a bigger partition for lower levels of integrity tree 302 (e.g., level_0 303) may benefit client platforms while a bigger partition for higher levels of integrity tree 302 (e.g., level_N−1 306) may benefit server platforms. In various embodiments described herein, in order to promote convergence among various platforms, partitioning of MEE cache 110 may be dynamic and/or configurable to enable a platform to realize better performance regardless of platform type. In various embodiments, a manufacturer or original equipment manufacturer (OEM) may be able to select a partitioning that exhibits the best bandwidth characteristics for a particular implementation.

In one or more embodiments, to enable flexible partitioning of MEE cache 110, a register for each level of branch nodes 214 may be included. In one or more such embodiments, the root node 208 is always stored in internal memory 204 and not cached in MEE cache 110, thus a partition register may not be included for root nodes. In some embodiments, partition registers 108 may be control registers internal to the MEE. In various embodiments, partition registers 108 may be programmed by the BIOS or ucode. For example, ucode may program several registers for MEE configuration including key registers. In some such examples, partition registers 108 may be additional registers that get programmed as part of MEE initialization. In one or more embodiments, having registers for each partition may allow for flexibility in partitioning.

It will be appreciated that partitioning of MEE cache 110 is not limited to any particular partitioning scheme described herein, and may be substituted or combined with other ways to partition the cache as well. In various embodiments, the partitioning approach may be dynamically available at run time. For instance, the allocation may be updated periodically. In such instances, caches ways or cache lines may be assigned to levels of integrity tree 302 based on gain of each level at run time. As used herein, gain may refer to the number of additional hits for a respective tree level when a new partition is allocated to the respective tree level. In some embodiments, initially one partition of the MEE cache 110 may be may be allocated to each level of integrity tree 302. In some such embodiments, after a certain number of memory references, one of the free partitions or one of the partitions with the lowest hit rate may be assigned/reassigned to the level of the integrity tree 302 that can achieve the highest gain. For instance, in server platforms, all partitions may be allocated to high level nodes (e.g., level_N−1 306). In another instance, in client platforms, all partitions may be allocated to low level nodes (e.g., level_0 303). In one or more embodiments, a machine learning algorithm may be used to determine how to partition/repartition MEE cache 106. In various embodiments, dynamic allocation of partitions may result in bandwidth savings. For instance, up to 15% savings in bandwidth usage over platforms without cryptographic metadata cache partitioning.

Figure 4:
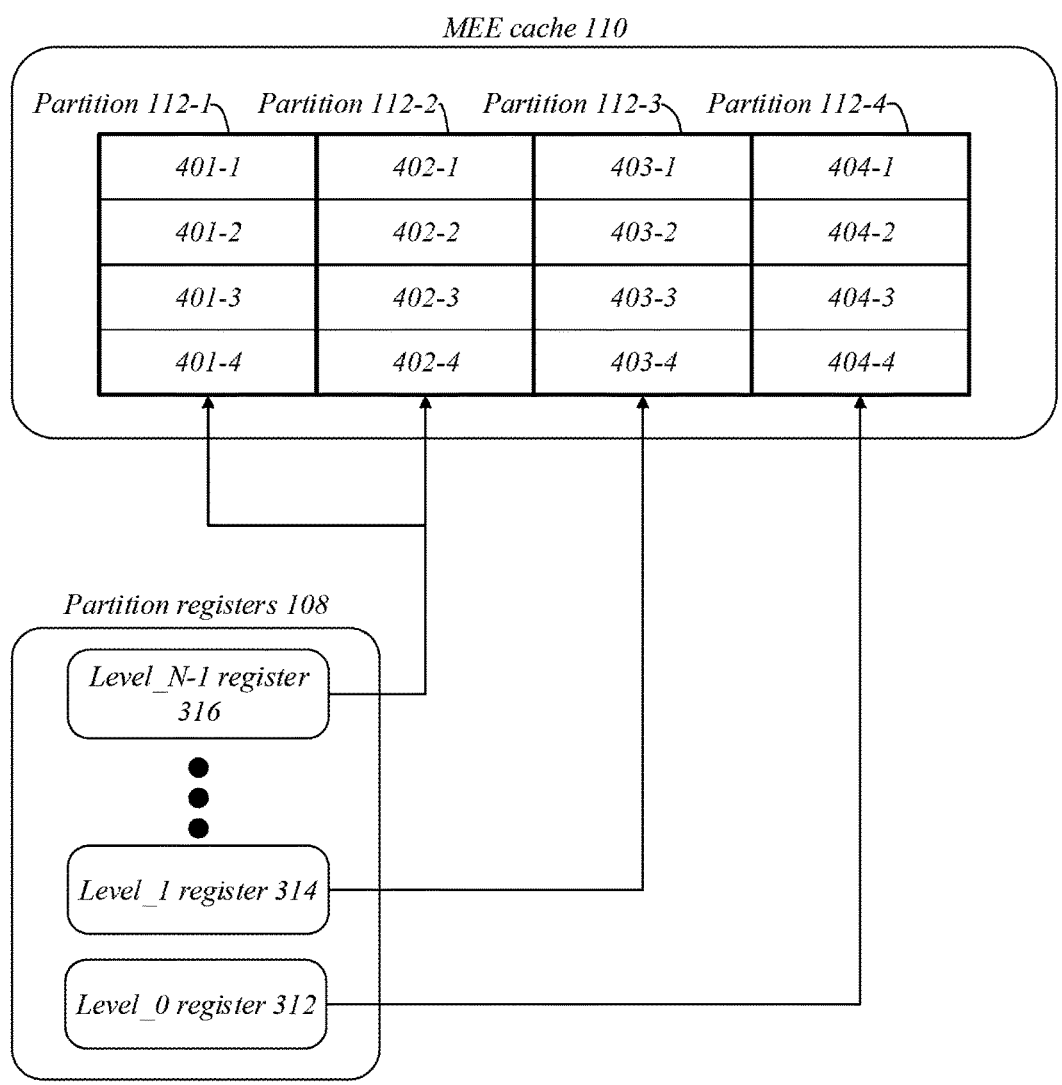
FIG. 4 illustrates an embodiment of a fourth operating environment.

FIG. 4 illustrates an example of an operating environment 400 that may be representative of various embodiments. Operating environment 400 may include partition registers 108 in conjunction with MEE cache 110. In the illustrated embodiment, MEE cache 110 may be a 4-way set-associative cache. As shown in FIG. 4, MEE cache 110 may be divided between three different tree levels with level_N−1 allocated to partitions 112-1, 112-2, level_1 allocated to partition 112-3, and level_0 allocated to partition 112-4. In some embodiments, each of partition 112-1, 112-2, 112-3, 112-4 may include four cache lines. For instance, partition 112-1 may include cache lines 401-1, 401-2, 401-3, 401-4, partition 112-2 may include cache lines 402-1, 402-2, 402-3, 402-4, partition 112-3 may include cache lines 403-1, 403-2, 403-3, 403-4, and partition 112-4 may include cache lines 404-1, 404-2, 404-3, 404-4. In one or more embodiments described herein, when a branch node is read from main memory 114, cache manager 106 may determine where to store the branch node in the associated partition(s) of MEE cache 110 based on cache replacement policy 210. Embodiments are not limited in this context.

In some embodiments, on fetching a branch node from main memory 114, partition registers 108 may be looked up to determine if there is a valid partition for the level being filled in MEE cache 110. if there is no partition allocated in MEE cache 110, the branch metadata loaded from main memory 114 may not be stored in MEE cache 110. If, on the other hand, there is a valid partition for the node based on its level, cache manager 106 may utilize cache replacement policy 210 to find an empty way or line in the allocated partition for the level. If one is found, the incoming line is inserted in the empty way or line. If on the other hand, an empty way or line is not found, cache manager 106 may utilize cache replacement policy 210 to find a victim way or line. For instance, cache replacement policy 210 may include a pseudo-least recently used (LRU) cache replacement policy to find a victim way or line. The line present in the victim way or line may then be replaced with the incoming request.

Figure 5:
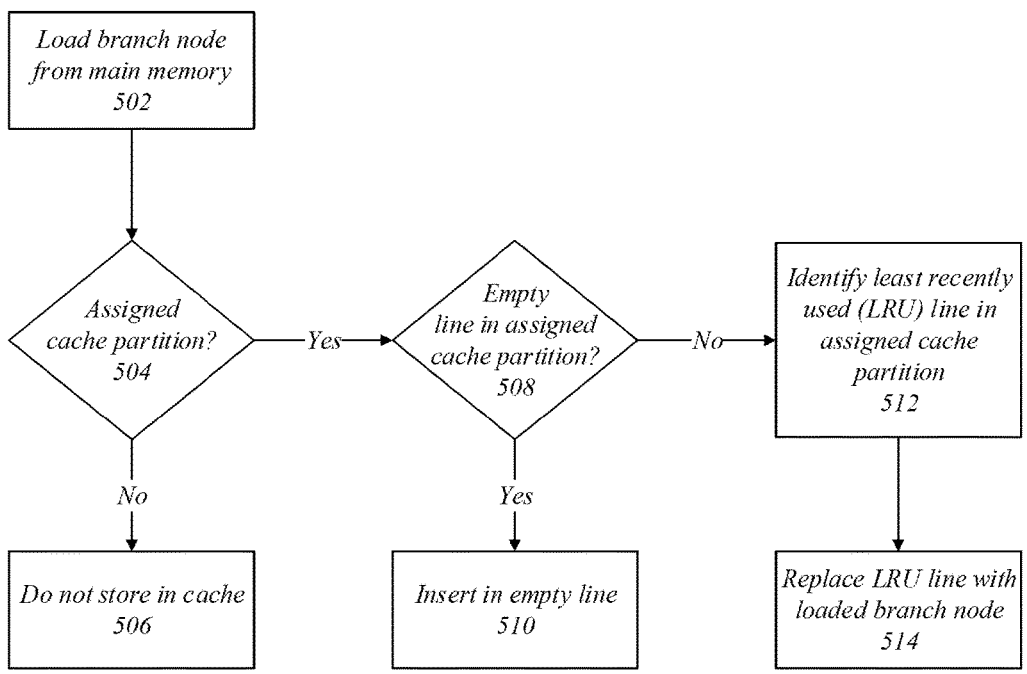
FIG. 5 illustrates an embodiment of a first logic flow.

FIG. 5 illustrates one embodiment of a logic flow 500, which may be representative of operations that may be executed in various embodiments, such as in conjunction with a cache replacement policy 210. The logic flow 500 may be representative of some or all of the operations that may be executed by one or more components of operating environments 100, 200, 300, 400 of FIGS. 1-4, such as MEE 104 or cache manager 106. The embodiments are not limited in this context.

In the illustrated embodiment shown in FIG. 5, the logic flow 500 may begin at block 502. At block 502 "load branch node from main memory" a branch node may be loaded from main memory. For example, one of branch nodes 214 may be loaded from main memory 114. In some embodiments, the branch node may be loaded from main memory in order to verify one of encrypted data lines 220 in protected memory 218 is fresh and unmodified.

At block 504 "assigned cache partition?" it may be determined whether a cache partition has been assigned to a tree level associated with the branch node. For instance, cache manager 104 may look up the partition register of partition registers 108 associated with the tree level of the loaded branch node to determine whether the tree level associated with the loaded branch node has been assigned a cache partition in MEE cache 110. If a cache partition has not been allocated to the tree level associated with the loaded branch node, logic flow 500 may proceed to block 506. At block 506 "do not store in cache" the loaded branch node may not be stored in the cache. For instance, if branch metadata 310-2 of level_1 304 comprised the loaded branch node, and no partition of MEE cache 110 is allocated to level_1 304, then branch metadata 310-2 may not be stored to MEE cache 110.

Referring back to block 504, if a cache partition has been allocated to the tree level associated with the loaded branch node, logic flow 500 may proceed to block 508. For instance, if branch metadata 310-1 of level_0 303 comprised the loaded branch node, and partition 112-4 of MEE cache 110 is allocated to level_0 303, then logic flow 500 may proceed to block 508. At block 508 "empty line in assigned cache partition?" it may be determined whether there is an empty line in the assigned cache partition. For instance, if the loaded branch node is associated with level_0 303, cache manager 106 may utilize cache replacement policy 210 to determine if any of cache lines 404-1, 404-2, 404-3, 404-4 of partition 112-4 are empty. If an empty cache line is identified, then logic flow 500 may proceed to block 510. At block 510 "insert in empty line" the loaded branch node may be stored to the empty line. For example, if cache line 404-2 is determined to be empty and the loaded branch node is associated with level_0 303, then the loaded branch node may be stored to cache line 404-2 of partition 112-4.

Referring back to block 508, if an empty line is not identified in the assigned cache partition, logic flow 500 may proceed to block 512. For instance, if branch metadata 310-1 of level_0 303 comprised the loaded branch node, partition 112-4 of MEE cache 110 is allocated to level_0 303, and none of cache lines 404-1, 404-2, 404-3, 404-4 are empty, then logic flow 500 may proceed to block 512. At block 512 "identify least recently used (LRU) line in assigned cache partition" the LRU line in the assigned cache partition may be identified. For example, cache manager 106 may identify the cache line that was used least recently in the assigned partition. Continuing to block 514 "replace LRU line with loaded branch node" the loaded branch node may be used to replace the LRU line in the assigned cache partition. For instance, if partition 112-3 is the assigned cache partition and cache line 403-1 is identified as the LRU line, then the loaded branch node may be stored in cache line 403-1.

Figure 6:
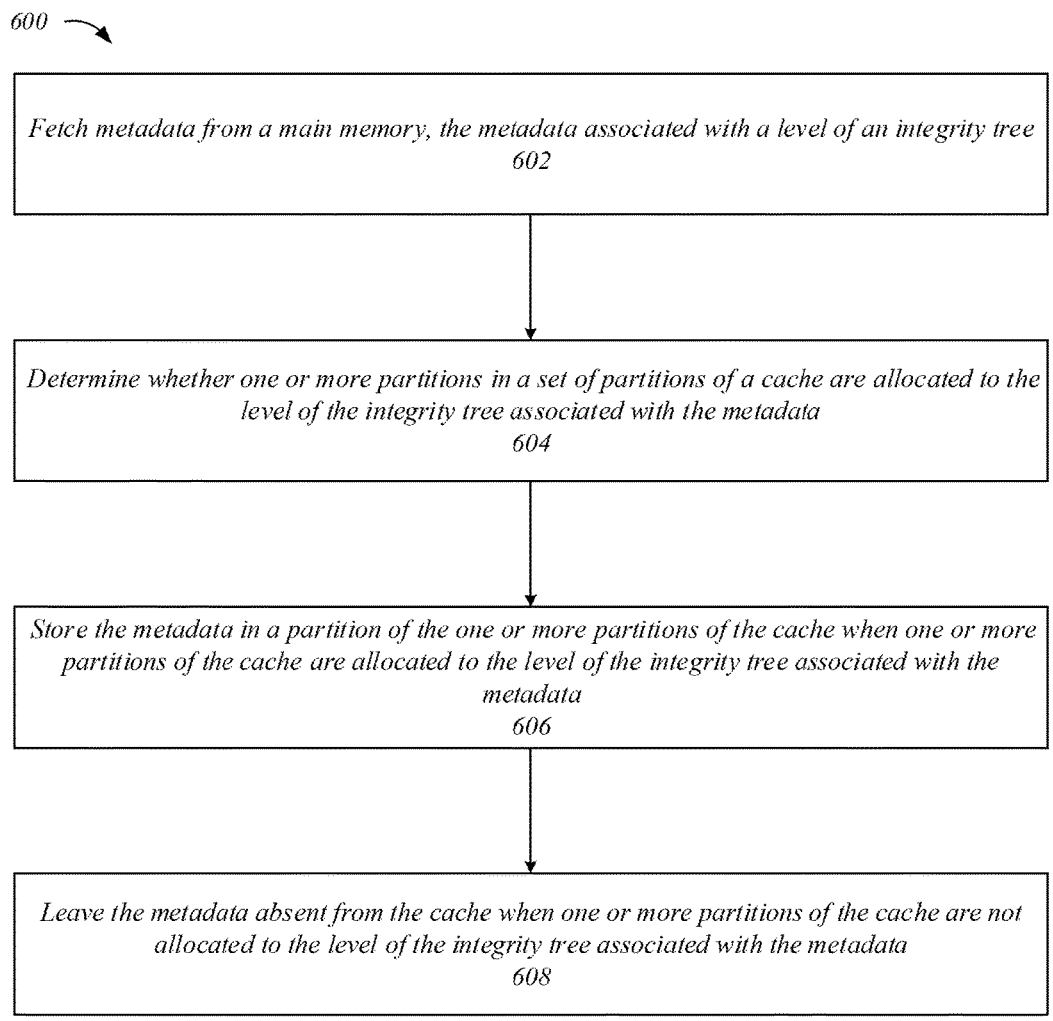
FIG. 6 illustrates an embodiment of a second logic flow.

FIG. 6 illustrates one embodiment of a logic flow 600, which may be representative of operations that may be executed in various embodiments, such as in conjunction with a cache replacement policy 210. The logic flow 500 may be representative of some or all of the operations that may be executed by one or more components of operating environments 100, 200, 300, 400 of FIGS. 1-4, such as MEE 104 or cache manager 106. The embodiments are not limited in this context.

In the illustrated embodiment shown in FIG. 6, the logic flow 600 may begin at block 602. At block 602 "fetch metadata from a main memory, the metadata associated with a level of an integrity tree" metadata associated with a level of an integrity tree may be fetched from main memory. For instance, a branch node comprising a portion of branch metadata 216 of branch nodes 214 may be loaded from main memory 114. In such instances, the branch node may be associated with a level of integrity tree 302. In some embodiments, the branch node may be loaded as part of a tree walk to verify a data line of encrypted data lines 220 in protected memory 218 has not been tampered with and/or snooped.

Proceeding to block 604 "determine whether one or more partitions in a set of partitions of a cache are allocated to the level of the integrity tree associated with the metadata" whether one or more partitions in a set of partitions of a cache are allocated to the level of the integrity tree associated with the metadata may be determined. For example, a partition register of partition registers 108 associated with the level of integrity tree 302 corresponding to the metadata may be utilized by cache manager 106 to determine whether one or more partitions in a set of partitions (e.g., partitions 112-1, 112-2, 112-3, 112-4) are allocated to the tree level.

At block 606 "store the metadata in a partition of the one or more partitions of the cache when one or more partitions of the cache are allocated to the level of the integrity tree associated with the metadata" when one or more partitions of the cache are allocated to the level of the integrity tree associated with the metadata the metadata may be stored in a partition of the one or more partitions. For instance, if the metadata fetched from main memory includes branch metadata 310-3 of level N−1 306, then branch metadata 310-3 may be stored to partition 112-1 or partition 112-2 of MEE cache 110. In some such instances, which of partition 112-1 or partition 112-2 branch metadata 310-3 is stored to may be based on cache replacement policy 210. In some embodiments, cache manager 104 may look up the partition register of partition registers 108 associated with the tree level of the metadata to determine the tree level associated with the metadata has been assigned one or more cache partitions in MEE cache 110. In some such embodiments, in response, cache manager 104 may store the metadata to a partition of the one or more assigned cache partitions in MEE cache 110.

Continuing to block 608 "leave the metadata absent from the cache when one or more partitions of the cache are not allocated to the level of the integrity tree associated with the metadata" when one or more partitions of the cache are not allocated to the level of the integrity tree associated with the metadata, the metadata may be left absent from the cache. For instance, cache manager 104 may look up the partition register of partition registers 108 associated with the tree level of the metadata to determine the tree level associated with the metadata has not been assigned a cache partition in MEE cache 110. In some such instances, in response, cache manager 104 may leave the metadata absent from MEE cache 110.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flows 500 and 600 of FIGS. 4 and 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
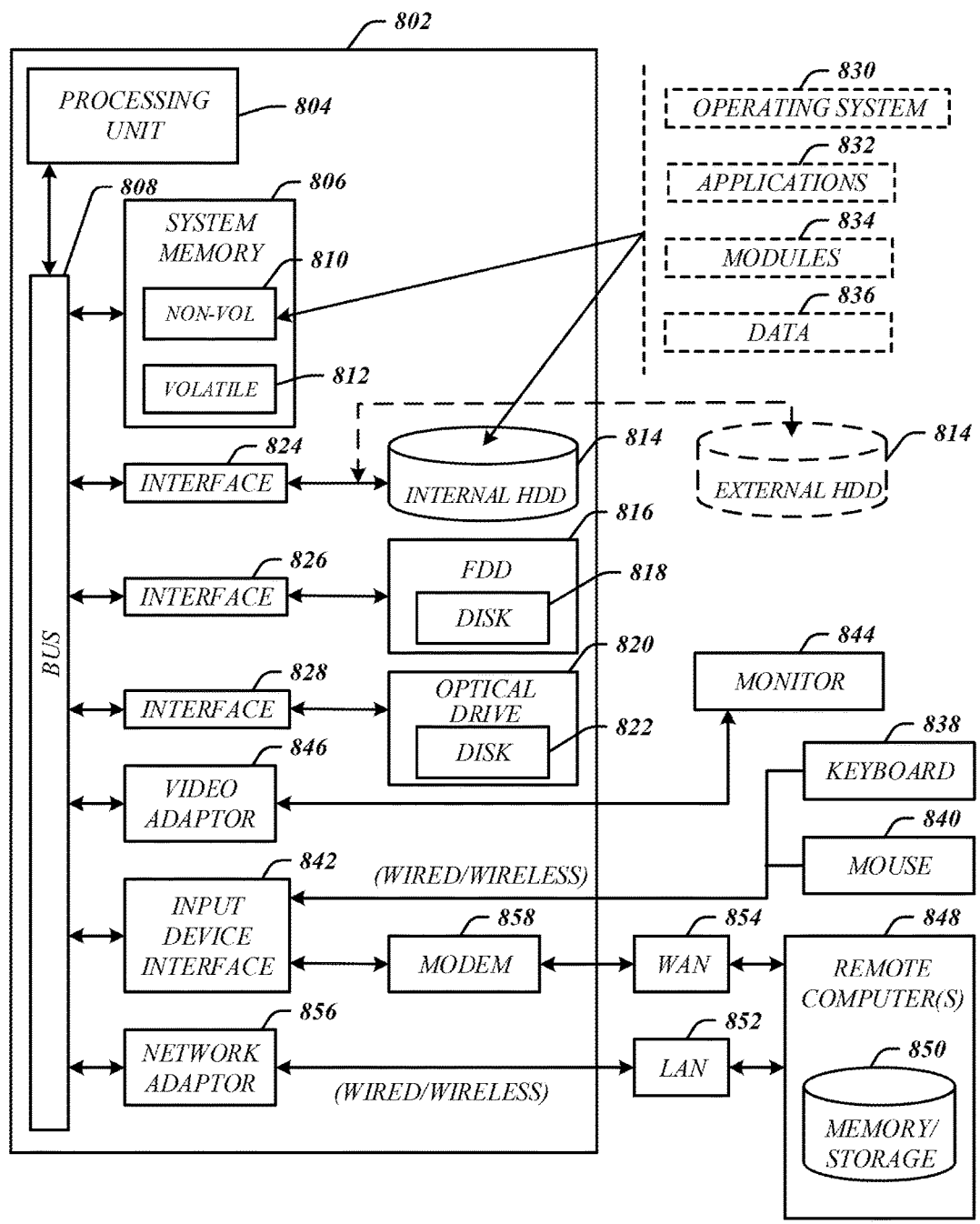
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environments 100, 200, 300, 400 of FIGS. 1-4. In some embodiments, computing architecture 800 may be representative, for example, of one or more portions or components of TEE 102 or main memory 114 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information.

For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the TEE 102, such as one or more portions of cache manager 106.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
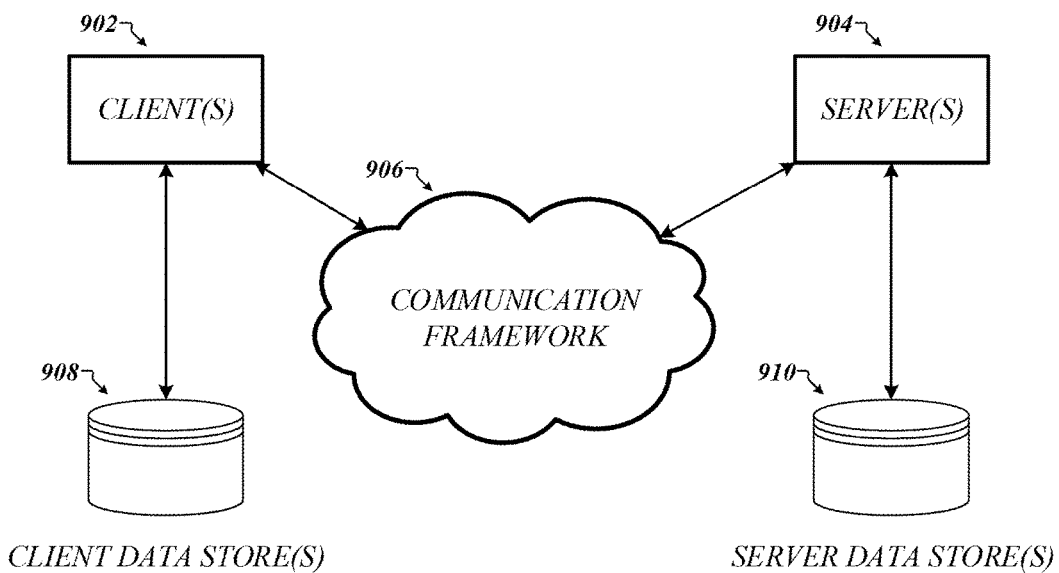
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for managing encrypted data, the apparatus comprising: a memory; and logic for a memory encryption engine (MEE), at least a portion of the logic implemented in circuitry coupled to the memory, the logic to: fetch metadata from a main memory, the metadata associated with a level of an integrity tree; determine whether one or more partitions in a set of partitions of a cache are allocated to the level of the integrity tree associated with the metadata; and store the metadata in a partition of the one or more partitions of the cache when one or more partitions of the cache are allocated to the level of the integrity tree associated with the metadata.

Example 2 includes the subject matter of Example 1, the integrity tree comprising a number of levels, N, wherein the $N^{th}$ level comprises a root node of the integrity tree and each of the N−1 other levels of the integrity tree comprise at least one branch node in a set of branch nodes of the integrity tree, a branch node of the set of branch nodes comprising the metadata.

Example 3 includes the subject matter of Example 2, the metadata comprising a counter value stored in the branch node of the set of branch nodes.

Example 4 includes the subject matter of Example 2, the logic to reallocate at least one partition in the set of partitions from a first level of the N−1 other levels of the integrity tree to a second level of the N−1 other levels of the integrity tree.

Example 5 includes the subject matter of Example 4, the logic to reallocate the at least one partition in the set of partitions from the first level to the second level based on hit rates in the cache associated with the first level and the second level.

Example 6 includes the subject matter of Example 4, the logic to reallocate the at least one partition in the set of partitions based on a number of additional hits for the first level when an additional partition in the set of partitions is allocated or reallocated to the first level.

Example 7 includes the subject matter of Example 4, the logic to remove an association of the at least one partition from a first partition register associated with the first level and store an association of the at least one partition to a second partition register associated with the second level to reallocate the at least one partition in the set of partitions.

Example 8 includes the subject matter of Example 2, comprising a set of partition registers, the set of partition registers including a partition register associated with each of the N−1 other levels of the integrity tree, each respective partition register in the set of partition registers to include an indication of any partitions of the one or more partitions of the cache that are allocated to the level of the integrity tree associated with the respective partition register.

Example 9 includes the subject matter of Example 8, the logic to determine whether one or more partitions in the set of partitions of the cache allocated to the level of the integrity tree associated with the metadata based on the set of partition registers.

Example 10 includes the subject matter of Example 8, one or more partition registers in the set of partition registers comprising a control register programmed by a basic input/output system (BIOS) or ucode.

Example 11 includes the subject matter of Example 1, each partition of the set of partitions comprising one or more storage locations, the logic to determine whether the one or more partitions allocated to the level of the integrity tree associated with the metadata include one or more empty storage locations.

Example 12 includes the subject matter of Example 11, the logic to store the metadata to an empty storage location of the one or more empty storage locations when the one or more partitions allocated to the level of the integrity tree associated with the metadata include one or more empty storage locations.

Example 13 includes the subject matter of Example 11, the logic to select a storage location in the one or more partitions allocated to the level of the integrity tree associated with the metadata to store the metadata when no partitions allocated to the level of the integrity tree associated with the metadata include one or more empty storage locations based on a cache replacement policy.

Example 14 includes the subject matter of Example 13, the cache replacement policy comprising a pseudo least recently used (LRU) cache replacement policy.

Example 15 includes the subject matter of Example 1, each partition in the set of partitions of the cache comprising a cache way.

Example 16 includes the subject matter of Example 1, the logic to fetch the metadata from the main memory in response to a miss stream coming out of a last level cache (LLC).

Example 17 includes the subject matter of Example 1, comprising a trusted execution environment (TEE), the TEE to include the memory, the cache, and the logic for the MEE.

Example 18 includes the subject matter of Example 1, the logic to leave the metadata absent from the cache when one or more partitions of the cache are not allocated to the level of the integrity tree associated with the metadata.

Example 19 is at least one non-transitory computer-readable medium comprising a set of instructions that, in response to being executed at a computing device, cause the computing device to: fetch metadata from a main memory, the metadata associated with a level of an integrity tree; determine whether one or more partitions in a set of partitions of a cache are allocated to the level of the integrity tree associated with the metadata; and store the metadata in a partition of the one or more partitions of the cache when one or more partitions of the cache are allocated to the level of the integrity tree associated with the metadata.

Example 20 includes the subject matter of Example 19, comprising instructions that, in response to being executed at the computing device, cause the computing device to leave the metadata absent from the cache when one or more partitions of the cache are not allocated to the level of the integrity tree associated with the metadata.

Example 21 includes the subject matter of Example 19, the integrity tree comprising a number of levels, N, wherein the $N^{th}$ level comprises a root node of the integrity tree and each of the N-1 other levels of the integrity tree comprise at least one branch node in a set of branch nodes of the integrity tree, a branch node of the set of branch nodes comprising the metadata.

Example 22 includes the subject matter of Example 21, comprising instructions that, in response to being executed at the computing device, cause the computing device to reallocate at least one partition in the set of partitions from a first level of the N-1 other levels of the integrity tree to a second level of the N-1 other levels of the integrity tree.

Example 23 includes the subject matter of Example 22, comprising instructions that, in response to being executed at the computing device, cause the computing device to reallocate the at least one partition in the set of partitions from the first level to the second level based on hit rates in the cache associated with the first level and the second level.

Example 24 includes the subject matter of Example 22, comprising instructions that, in response to being executed at the computing device, cause the computing device to reallocate the at least one partition in the set of partitions based on a number of additional hits for the first level when an additional partition in the set of partitions is allocated or reallocated to the first level.

Example 25 includes the subject matter of Example 22, comprising instructions that, in response to being executed at the computing device, cause the computing device to remove an association of the at least one partition from a first partition register associated with the first level and store an association of the at least one partition to a second partition register associated with the second level to reallocate the at least one partition in the set of partitions.

Example 26 includes the subject matter of Example 21, comprising a set of partition registers, the set of partition registers including a partition register associated with each of the N-1 other levels of the integrity tree, each respective partition register in the set of partition registers to include an indication of any partitions of the one or more partitions of the cache that are allocated to the level of the integrity tree associated with the respective partition register.

Example 27 includes the subject matter of Example 26, comprising instructions that, in response to being executed at the computing device, cause the computing device to determine whether one or more partitions in the set of partitions of the cache allocated to the level of the integrity tree associated with the metadata based on the set of partition registers.

Example 28 includes the subject matter of Example 26, one or more partition registers in the set of partition registers comprising a control register programmed by a basic input/output system (BIOS) or ucode.

Example 29 includes the subject matter of Example 19, each partition of the set of partitions comprising one or more storage locations, and comprising instructions that, in response to being executed at the computing device, cause the computing device to determine whether the one or more partitions allocated to the level of the integrity tree associated with the metadata include one or more empty storage locations.

Example 30 includes the subject matter of Example 29, comprising instructions that, in response to being executed at the computing device, cause the computing device to store the metadata to an empty storage location of the one or more empty storage locations when the one or more partitions allocated to the level of the integrity tree associated with the metadata include one or more empty storage locations.

Example 31 includes the subject matter of Example 29, comprising instructions that, in response to being executed at the computing device, cause the computing device to select a storage location in the one or more partitions allocated to the level of the integrity tree associated with the metadata to store the metadata when no partitions allocated to the level of the integrity tree associated with the metadata include one or more empty storage locations based on a cache replacement policy.

Example 32 includes the subject matter of Example 31, the cache replacement policy comprising a pseudo least recently used (LRU) cache replacement policy.

Example 33 includes the subject matter of Example 19, each partition in the set of partitions of the cache comprising a cache way.

Example 34 includes the subject matter of Example 19, comprising instructions that, in response to being executed at the computing device, cause the computing device to fetch the metadata from the main memory in response to a miss stream coming out of a last level cache (LLC).

Example 35 includes the subject matter of Example 19, comprising a trusted execution environment (TEE), the TEE to include the cache and a root to the integrity tree.

Example 36 includes the subject matter of Example 19, the cache comprising on-chip memory and the main memory comprising random access memory (RAM).

Example 37 is a method for managing encrypted data, the method comprising: fetching metadata from a main memory, the metadata associated with a level of an integrity tree; determining whether one or more partitions in a set of partitions of a cache are allocated to the level of the integrity tree associated with the metadata; and storing the metadata in a partition of the one or more partitions of the cache when one or more partitions of the cache are allocated to the level of the integrity tree associated with the metadata.

Example 38 includes the subject matter of Example 37, the integrity tree comprising a number of levels, N, wherein the $N^{th}$ level comprises a root node of the integrity tree and each of the N−1 other levels of the integrity tree comprise at least one branch node in a set of branch nodes of the integrity tree, a branch node of the set of branch nodes comprising the metadata.

Example 37 includes the subject matter of Example 38, the metadata comprising a counter value stored in the branch node of the set of branch nodes.

Example 40 includes the subject matter of Example 38, comprising reallocating at least one partition in the set of partitions from a first level of the N−1 other levels of the integrity tree to a second level of the N−1 other levels of the integrity tree.

Example 41 includes the subject matter of Example 40, comprising reallocating the at least one partition in the set of partitions from the first level to the second level based on hit rates in the cache associated with the first level and the second level.

Example 42 includes the subject matter of Example 40, comprising reallocating the at least one partition in the set of partitions based on a number of additional hits for the first level when an additional partition in the set of partitions is allocated or reallocated to the first level.

Example 43 includes the subject matter of Example 40, comprising removing an association of the at least one partition from a first partition register associated with the first level and store an association of the at least one partition to a second partition register associated with the second level to reallocate the at least one partition in the set of partitions.

Example 44 includes the subject matter of Example 38, comprising a set of partition registers, the set of partition registers including a partition register associated with each of the N−1 other levels of the integrity tree, each respective partition register in the set of partition registers to include an indication of any partitions of the one or more partitions of the cache that are allocated to the level of the integrity tree associated with the respective partition register.

Example 45 includes the subject matter of Example 44, comprising determining whether one or more partitions in the set of partitions of the cache allocated to the level of the integrity tree associated with the metadata based on the set of partition registers.

Example 46 includes the subject matter of Example 44, one or more partition registers in the set of partition registers comprising a control register programmed by a basic input/output system (BIOS) or ucode.

Example 47 includes the subject matter of Example 37, each partition of the set of partitions comprising one or more storage locations, and comprising determining whether the one or more partitions allocated to the level of the integrity tree associated with the metadata include one or more empty storage locations.

Example 48 includes the subject matter of Example 47, comprising storing the metadata to an empty storage location of the one or more empty storage locations when the one or more partitions allocated to the level of the integrity tree associated with the metadata include one or more empty storage locations.

Example 49 includes the subject matter of Example 47, comprising selecting a storage location in the one or more partitions allocated to the level of the integrity tree associated with the metadata to store the metadata when no partitions allocated to the level of the integrity tree associated with the metadata include one or more empty storage locations based on a cache replacement policy.

Example 50 includes the subject matter of Example 49, the cache replacement policy comprising a pseudo least recently used (LRU) cache replacement policy.

Example 51 includes the subject matter of Example 37, each partition in the set of partitions of the cache comprising a cache way.

Example 52 includes the subject matter of Example 37, comprising fetching the metadata from the main memory in response to a miss stream coming out of a last level cache (LLC).

Example 53 includes the subject matter of Example 37, comprising a trusted execution environment (TEE), the TEE to include the cache and a root to the integrity tree.

Example 54 includes the subject matter of Example 37, comprising leaving the metadata absent from the cache when one or more partitions of the cache are not allocated to the level of the integrity tree associated with the metadata.

Example 55 is an apparatus for managing encrypted data, the apparatus comprising: means for fetching metadata from a main memory, the metadata associated with a level of an integrity tree; means for determining whether one or more partitions in a set of partitions of a cache are allocated to the level of the integrity tree associated with the metadata; and means for storing the metadata in a partition of the one or more partitions of the cache when one or more partitions of the cache are allocated to the level of the integrity tree associated with the metadata.

Example 56 includes the subject matter of Example 55, the integrity tree comprising a number of levels, N, wherein the $N^{th}$ level comprises a root node of the integrity tree and each of the N−1 other levels of the integrity tree comprise at least one branch node in a set of branch nodes of the integrity tree, a branch node of the set of branch nodes comprising the metadata.

Example 57 includes the subject matter of Example 56, the metadata comprising a counter value stored in the branch node of the set of branch nodes.

Example 58 includes the subject matter of Example 56, comprising means for reallocating at least one partition in the set of partitions from a first level of the N−1 other levels of the integrity tree to a second level of the N−1 other levels of the integrity tree.

Example 59 includes the subject matter of Example 58, comprising means for reallocating the at least one partition in the set of partitions from the first level to the second level based on hit rates in the cache associated with the first level and the second level.

Example 60 includes the subject matter of Example 58, comprising means for reallocating the at least one partition in the set of partitions based on a number of additional hits for the first level when an additional partition in the set of partitions is allocated or reallocated to the first level.

Example 61 includes the subject matter of Example 58, comprising means for removing an association of the at least one partition from a first partition register associated with the first level and store an association of the at least one partition to a second partition register associated with the second level to reallocate the at least one partition in the set of partitions.

Example 62 includes the subject matter of Example 56, comprising a set of partition registers, the set of partition registers including a partition register associated with each of the N−1 other levels of the integrity tree, each respective partition register in the set of partition registers to include an indication of any partitions of the one or more partitions of the cache that are allocated to the level of the integrity tree associated with the respective partition register.

Example 63 includes the subject matter of Example 62, comprising means for determining whether one or more partitions in the set of partitions of the cache allocated to the level of the integrity tree associated with the metadata based on the set of partition registers.

Example 64 includes the subject matter of Example 62, one or more partition registers in the set of partition registers comprising a control register programmed by a basic input/output system (BIOS) or ucode.

Example 65 includes the subject matter of Example 55, each partition of the set of partitions comprising one or more storage locations, and comprising means for determining whether the one or more partitions allocated to the level of the integrity tree associated with the metadata include one or more empty storage locations.

Example 66 includes the subject matter of Example 65, comprising means for storing the metadata to an empty storage location of the one or more empty storage locations when the one or more partitions allocated to the level of the integrity tree associated with the metadata include one or more empty storage locations.

Example 67 includes the subject matter of Example 65, comprising means for selecting a storage location in the one or more partitions allocated to the level of the integrity tree associated with the metadata to store the metadata when no partitions allocated to the level of the integrity tree associated with the metadata include one or more empty storage locations based on a cache replacement policy.

Example 68 includes the subject matter of Example 67, the cache replacement policy comprising a pseudo least recently used (LRU) cache replacement policy.

Example 69 includes the subject matter of Example 55, each partition in the set of partitions of the cache comprising a cache way.

Example 70 includes the subject matter of Example 55, comprising means for fetching the metadata from the main memory in response to a miss stream coming out of a last level cache (LLC).

Example 71 includes the subject matter of Example 55, comprising a trusted execution environment (TEE), the TEE to include the cache and a root to the integrity tree.

Example 72 includes the subject matter of Example 55, the cache comprising on-chip memory and the main memory comprising random access memory (RAM).

Example 73 includes the subject matter of Example 55, comprising means for leaving the metadata absent from the cache when one or more portions of the cache are not allocated to the level of the integrity tree associated with the metadata.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
a memory; and
logic for a memory encryption engine (MEE), at least a portion of the logic implemented in circuitry coupled to the memory, the logic to:
fetch metadata from a main memory, the metadata associated with a level of an integrity tree;
determine one or more partitions in a set of partitions of a cache are allocated to the level of the integrity tree associated with the metadata, each partition in the set of partitions of the cache comprising a cache way; and
store the metadata in a partition of the one or more partitions of the cache based on allocation of the one or more partitions of the cache to the level of the integrity tree associated with the metadata.

2. The apparatus of claim 1, the integrity tree comprising a number of levels, N, wherein the $N^{th}$ level comprises a root node of the integrity tree and each of the N−1 other levels of the integrity tree comprise at least one branch node in a set of branch nodes of the integrity tree, a branch node of the set of branch nodes comprising the metadata.

3. The apparatus of claim 2, the metadata comprising a counter value stored in the branch node of the set of branch nodes.

4. The apparatus of claim 2, the logic to reallocate at least one partition in the set of partitions from a first level of the N−1 other levels of the integrity tree to a second level of the N−1 other levels of the integrity tree.

5. The apparatus of claim 4, the logic to reallocate the at least one partition in the set of partitions from the first level to the second level based on hit rates in the cache associated with the first level and the second level.

6. The apparatus of claim 4, the logic to reallocate the at least one partition in the set of partitions based on a number of additional hits for the first level when an additional partition in the set of partitions is allocated or reallocated to the first level.

7. The apparatus of claim 4, the logic to remove an association of the at least one partition from a first partition register associated with the first level and store an association of the at least one partition to a second partition register associated with the second level to reallocate the at least one partition in the set of partitions.

8. The apparatus of claim 2, comprising a set of partition registers, the set of partition registers including a partition register associated with each of the N−1 other levels of the integrity tree, each respective partition register in the set of partition registers to include an indication of any partitions of the one or more partitions of the cache that are allocated to the level of the integrity tree associated with the respective partition register.

9. The apparatus of claim 8, the logic to determine the one or more partitions in the set of partitions of the cache are allocated to the level of the integrity tree associated with the metadata based on the set of partition registers.

10. The apparatus of claim 8, one or more partition registers in the set of partition registers comprising a control register programmed by a basic input/output system (BIOS) or ucode.

11. The apparatus of claim 1, each partition of the set of partitions comprising one or more storage locations, the logic to determine the one or more partitions allocated to the level of the integrity tree associated with the metadata include one or more empty storage locations.

12. The apparatus of claim 11, the logic to store the metadata to an empty storage location of the one or more empty storage locations when the one or more partitions allocated to the level of the integrity tree associated with the metadata include one or more empty storage locations.

13. The apparatus of claim 11, the logic to select a storage location in the one or more partitions allocated to the level of the integrity tree associated with the metadata to store the metadata when no partitions allocated to the level of the integrity tree associated with the metadata include one or more empty storage locations based on a cache replacement policy.

14. The apparatus of claim 13, the cache replacement policy comprising a pseudo least recently used (LRU) cache replacement policy.

15. The apparatus of claim 1, the logic to fetch the metadata from the main memory in response to a miss stream coming out of a last level cache (LLC).

16. The apparatus of claim 1, comprising a trusted execution environment (TEE), the TEE to include the memory, the cache, and the logic for the MEE.

17. The apparatus of claim 1, the logic to leave the metadata absent from the cache when one or more partitions of the cache are not allocated to the level of the integrity tree associated with the metadata.

18. At least one non-transitory computer-readable medium comprising a set of instructions that, in response to being executed at a computing device, cause the computing device to:
fetch metadata from a main memory, the metadata associated with a level of an integrity tree;
determine one or more partitions in a set of partitions of a cache are allocated to the level of the integrity tree associated with the metadata, each partition in the set of partitions of the cache comprising a cache way; and
store the metadata in a partition of the one or more partitions of the cache based on allocation of the one or more partitions of the cache to the level of the integrity tree associated with the metadata.

19. The at least one non-transitory computer-readable medium of claim 18, comprising instructions that, in response to being executed at the computing device, cause the computing device to leave the metadata absent from the cache when one or more partitions of the cache are not allocated to the level of the integrity tree associated with the metadata.

20. The at least one non-transitory computer-readable medium of claim 18, the integrity tree comprising a number of levels, N, wherein the $N^{th}$ level comprises a root node of the integrity tree and each of the N−1 other levels of the integrity tree comprise at least one branch node in a set of branch nodes of the integrity tree, a branch node of the set of branch nodes comprising the metadata.

21. The at least one non-transitory computer-readable medium of claim 20, comprising instructions that, in response to being executed at the computing device, cause the computing device to reallocate at least one partition in the set of partitions from a first level of the N−1 other levels of the integrity tree to a second level of the N−1 other levels of the integrity tree.

22. A method, comprising:
fetching metadata from a main memory, the metadata associated with a level of an integrity tree;
determining one or more partitions in a set of partitions of a cache are allocated to the level of the integrity tree associated with the metadata, each partition in the set of partitions of the cache comprising a cache way; and
storing the metadata in a partition of the one or more partitions of the cache based on allocation of the one or more partitions of the cache to the level of the integrity tree associated with the metadata.

23. The method of claim 22, each partition of the set of partitions comprising one or more storage locations, and comprising determining the one or more partitions allocated to the level of the integrity tree associated with the metadata include one or more empty storage locations.

24. The method of claim 23, comprising storing the metadata to an empty storage location of the one or more empty storage locations when the one or more partitions allocated to the level of the integrity tree associated with the metadata include one or more empty storage locations.

* * * * *